Figure 1:
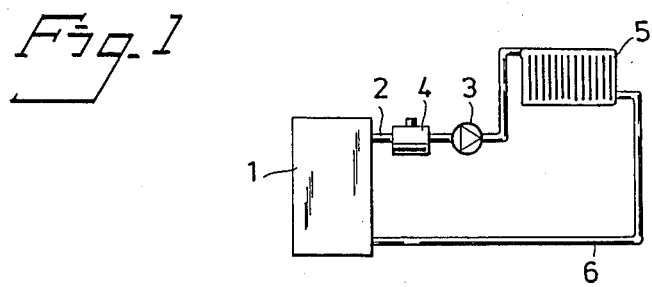

United States Patent [19]

Persson

[11] Patent Number: 4,723,705

[45] Date of Patent: Feb. 9, 1988

[54] DEVICE FOR VENTILATING A CLOSED CONDUIT SYSTEM

[76] Inventor: Bengt A. Persson, Corso Italia 28 B, Ch-6911 Campione D'Italia, Switzerland

[21] Appl. No.: 22,374

[22] Filed: Mar. 5, 1987

[30] Foreign Application Priority Data

Mar. 10, 1986 [SE] Sweden .................................. 8601090

[51] Int. Cl.⁴ ............................................... F24D 3/10
[52] U.S. Cl. .......................................... 237/66; 237/56
[58] Field of Search ............................ 237/56, 8 R, 66

[56] References Cited

FOREIGN PATENT DOCUMENTS 2136311 2/1973 Fed. Rep. of Germany ........ 237/66

Primary Examiner—Henry Bennett
Attorney, Agent, or Firm—Kinzer, Plyer, Dorn, McEachran & Jambor

[57] ABSTRACT

A ventilating device for a closed conduit system comprising a housing (7) with a liquid throughflow conduit (11) extending through end walls (8,9) of the housing. The throughflow conduit (11) has a liquid permeable part (13) which is directed towards an upper air vent (23) and the end edges of which are spaced from the end walls, and the side edges of which part (13) adjoining the end edges are preferably provided with wing-like elements (21,22) whose free edges form gaps with the inner wall of the housing. Liquid flows out beneath the conduit through those gaps (D,E) located between the end walls and the end edges of the wing-like element, and small air bubbles enclosed in the liquid form larger air bubbles which rise up between the wing-like element and the inner wall of the housing and depart through the vents (23).

6 Claims, 3 Drawing Figures

U.S. Patent  Feb. 9, 1988  4,723,705

DEVICE FOR VENTILATING A CLOSED CONDUIT SYSTEM

This invention relates to a device for ventilating a closed conduit system in which liquid is circulated by means of a pump, the device comprising a housing which forms part of a substantially horizontal branch conduit or flow conduit and which is provided with an upper air vent for the evacuation of air bubbles departing from the liquid, and two walls located at a respective opposite end of the housing and to which the branch conduit or flow conduit can be connected.

Such devices are used, for example, in heating systems, in which the liquid circulating in the system, normally water, is passed through the device at highly varying temperatures, for the purpose of separating from the liquid air bubbles forming therein. The devices are normally constructed to separate essentially large air bubbles having a high degree of buoyancy, whereas small bubbles, on the other hand, do not remain in the ventilating device, but are pumped round the conduit system until, after a very long time, they grow large enough to be retained in the ventilating device or separator and depart through the vent thereof, these small bubbles manifesting themselves, for example, by clouding the liquid. Those air bubbles which are pumped continuously around the system must be removed therefrom as soon as possible, in order to prevent corrosion and cavitation in the pump.

Accordingly, a prime object of the invention is to provide a device of the kind described in the introduction which causes small bubbles of air or steam to form agglomerates which transform into large air bubbles, which are then collected in the separator and depart therefrom.

Figure 2:
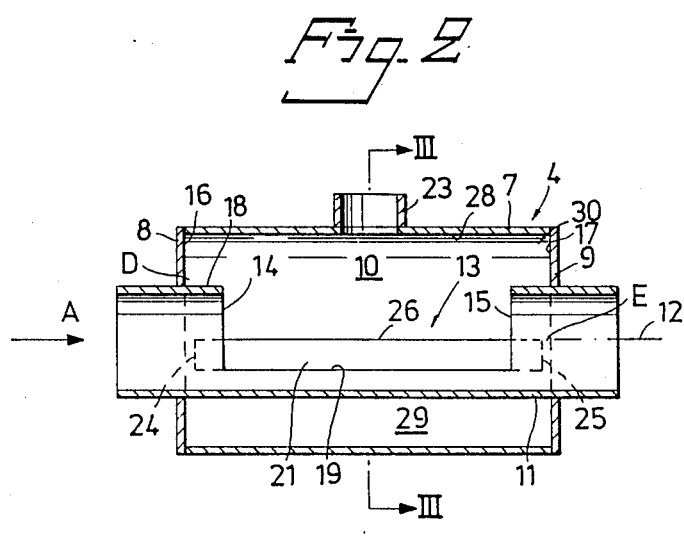
Figure 3:
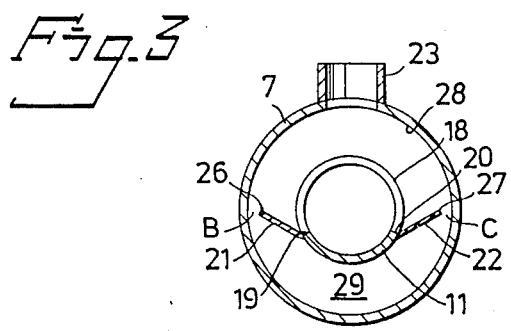

This object is achieved to the full by means of the invention set forth in the following claims and described hereinafter with reference to an exemplifying embodiment thereof illustrated in the accompanying drawings, in which FIG. 1 illustrates schematically a water heating system provided with an air ventilating device according to the invention;

FIG. 2 is a longitudinal sectional view of the ventilating device illustrated in FIG. 1; and FIG. 3 is a sectional view taken on the line III—III in FIG. 2.

FIG. 2 a highly simplified illustration of a closed conduit system incorporating a water heater or 1 having a flow conduit 2 and, in the illustrated system, a ventilating or purging device located upstream of a circulation pump 3. The flow conduit 2, which extends at least substantially horizontally, transfers heated water to a radiator 5 via a ventilating or purging device 4, the radiator being connected to a return conduit 6 leading to the water heater 1.

An exemplifying embodiment of the device for deaerating the water, or the other liquid used in the conduit system, is illustrated in FIGS. 2 and 3. The ventilating device 4 comprises a housing 7, which in the illustrated embodiment is of cylindrical configuration and has two end walls 8 and 9. Inserted in the end walls is a throughflow conduit 11 which extends through the interior 10 of the housing and which is connected to the flow conduit 2 and the return conduit 6, the longitudinal axis of the conduit 11 extending substantially horizontally, i.e. co-axially with the flow conduit 2. The throughflow conduit 11 has a central, liquid-permeable part 13, the axial extremities 14 and 15 of which are spaced from the inwardly facing, preferably planar wall surfaces 16 and 17 of respective end walls 8 and 9. In the illustrated embodiment, the liquid-permeable part 13 has the form of a cut-out or like aperture in the upper part of the conduit, but may also have the form of perforations which permit water or other liquid to flow outside the wall 18 of the conduit 11. As best seen from FIG. 3, the cut-out 13 has longitudinally extending edge parts 19, 20 to which are connected two wing-like elements or vanes 21 and 22 respectively, which in the illustrated embodiment are of planar rectangular configuration and parallel with the longitudinal axis 12 of the throughflow conduit 11. The wing-like elements extend obliquely upwards, towards the upper part of the housing 7. Arranged in the upper part of the housing is an air vent 23 which, although not shown, is connected to a conventional air ventilating valve or to a vent pipe whose exit orifice lies above the highest point in the system. The end edges 24, 25 of respective wing-like elements 21, 22 are spaced from the inner wall surface of the wall 8 and 9 respectively, and the longitudinally extending edges 26 and 27 are spaced from the inner wall 28 of the housing 7. Liquid supplied in the direction of the arrow A to the deaerating device 4 by means of the pump 3 can thus flow down into the gaps B and C between the housing and the longitudinal edges of the wing-like elements and also, which is important, externally of the conduit 11 in the vicinity of the ends 24, 25 of said wing-like elements through the gaps D and E between the inner surfaces 16 and 17 of the end walls and the ends 24 and 25 of the wing-like elements, down into the space 29 beneath the conduit 11 and into the space 30 located between the housing 7 and the imperforate part of the throughflow conduit 11. Although the illustrated embodiment incorporates two such throughflow gaps D and E, it will be understood that with regard to functionability it is only necessary to arrange one gap on the outlet side of the device. Thus, with the illustrated flow direction A it is only necessary to provide one gap E. The reason why two gaps D, E are shown is because the device shall also be capable of functioning when the flow is reversed. The water flowing into the space 29 lacks appreciable turbulence and the small air bubbles present in the water will rapidly form air bubble agglomerations which fuse together to form a large air bubble which, when departing from the wing edge 26 or 28, rises upwardly externally of the liquid flow passing directly from the inlet to the outlet, and thus passes undisturbed upwardly to the vent 23 and passes to atmosphere via the aforesaid valve or the riser pipe.

In order for the extremely small air bubbles present in the water, or in any other liquid used, to fuse together to form large air bubbles having sufficient buoyancy to rise up through the vent or outlet 23, it is necessary to drastically decrease the speed of the liquid and for turbulence to cease, or at least substantially cease, this being achieved by means of the flow retarding spaces 29 and 30. All oxygen dissolved in the liquid and forming the aforesaid small bubbles will reach the spaces 29 and 30 relatively quickly and while the liquid is moving slowly through the aforesaid spaces the minute bubbles agglomerate together rapidly and positively, wherewith all of the liquid present in the system is diaerated in an extremely short space of time. Depending on the rate of flow through the conduit system, it may be advantageous in certain instances to incorporate flow barrier means externally of the throughflow conduit in the aforesaid spaces or chambers in the housing, these flow barrier means suitably having the form, for example, of planar perforated plates positioned at right angles to the longitudinal axis 12 of the throughflow conduit 11.

The aforedescribed air ventilating device operates in the following manner. Water introduced into the cohduit 11 through the left end thereof as seen in FIG. 2 will partially leave the conduit 11 and flow into the space 10 towards the inner wall surface of the wall 9, and into the annular space 30, where the flow rate is lowered and the water conducted, via the gap E, down into the space 29 located beneath the wing elements 21,22. A certain amount of water containing small air bubbles will also flow past the longitudinal edges 26 and 27 of the wing-like elements, down into the space 29 located beneath the conduit 11. The water flowing into the space 29 is replaced, relatively slowly, with fresh water containing air bubbles, and can be considered to be totally free of turbulence. The minute bubbles of air in the water present in the space 29 will rapidly fuse together to form separate, highly buoyant larger air bubbles, which float up through the gaps B and C and from there to the venting outlet 23. It has been found in practice that relatively large quantities of liquid can be deaerated very quickly.

The aforedescribed, preferred embodiment of the air ventilating device can be modified in various ways. For example, the fully open water-outlet part 13 can be replaced with throughflow openings or perforations located in more or less close proximity with one another in the wall surface 18 of the conduit 11 facing the vent 23. In the illustrated embodiment, the cut-out 13 embraces approximately 240° of the circumference of said conduit 11, i.e. 120° on both sides of a vertical plane through the centre axis 12 of the conduit 11, although it will be understood that this angle can be varied within wide limits. Although the wing-like elements are shown in the drawing to be of planar and rectangular configuration, they may also have the form of a chute with concave surface facing the cut-out 13. The gaps B and C are preferably of uniform width along the whole length of the wing-like elements 21,22. In the illustrated embodiment, the housing 7 has a cylindrical configuration with the cylindrical inner wall 28 extending co-axially with the cylindrical throughflow conduit 11, although it is also possible, for example, to displace the throughflow conduit 11 so that it lies closer to or further from the vent outlet 23, although still with its axis 12 parallel with the centre axis of the housing.

Although it has been assumed that the walls 8,9 of the housing 7 are planar, they may alternatively have the form of outwardly bulging plates or like elements. Practical tests have shown that acceptable deaeration of the liquid is also obtained when the gaps B and C are increased, by totally omitting the wing-like elements 21 and 22 of the aforedescribed, preferred embodiment, in which case the space or chamber 29 is defined upwardly solely by the imperforate bottom part of the throughflow conduit 11.

I claim:

1. A device for ventilating a closed conduit system in which liquid is circulated by means of a pump (3), the device comprising a housing (7) which forms part of a substantially horizontal branch conduit or flow conduit (2) and which is provided with an upper vent outlet (23) for air bubbles departing from the liquid, and further comprises two end walls (8, 9) which are located at two mutually opposite ends of the housing and to which the flow conduit can be connected, characterized in that the housing (7) has arranged therein a cylindrical throughflow conduit (11) with the end parts thereof, intended for connection to said flow conduits (2), projecting through the end walls (8, 9); and in that the throughflow conduit (11) has a central, liquid-permeable part (13) directed toward the upper vent outlet (23), the end extremities (14, 15) of the permeable part (13) being spaced from the inner wall surface (16, 17) of respective end walls, two wing-like elements (21, 22) being located on the throughflow conduit (11) substantially parallel with the longitudinal axis (12) thereof beneath or adjoining the side edges (19, 20) adjoining the end extremities of the liquid permeable part (13); with the free longitudinal edges (26, 27) of the wing-like elements being spaced from the inner wall surface (28) of the housing (7) so as to form two throughflow gaps (B, C); and in that the end edges (24, 25) of the wing-like elements at at least one end of the housing (7) are spaced from the inner wall surface of the adjacent end wall.

2. A device according to claim 1 characterized in that the liquid permeable part comprises a free aperture (13).

3. A device according to claim 1 characterized in that the housing (7) has a cylindrical inner wall (28); and in that the throughflow conduit (11) is coaxial with the inner wall.

4. A device according to claim 1 characterized in that the wing-like elements (21,22) are substantially planar and the free longitudinal edges of the said elements extend parallel with the inner wall (28) of the housing.

5. A device according to claim 2 characterized in that the housing (7) has a cylindrical inner wall (28); and in that the throughflow conduit (11) is coaxial with the inner wall.

6. A device according to claim 2 characterized in that the wing-like elements (21,22) are substantially planar and the free longitudinal edges of the said elements extend parallel with the inner wall (28) of the housing.

* * * * *